Sept. 1, 1925.
S. A. CRONE
1,552,049
EMERGENCY SAFETY SUPPORT FOR BRAKE BEAMS
Filed Dec. 20, 1924   2 Sheets-Sheet 1
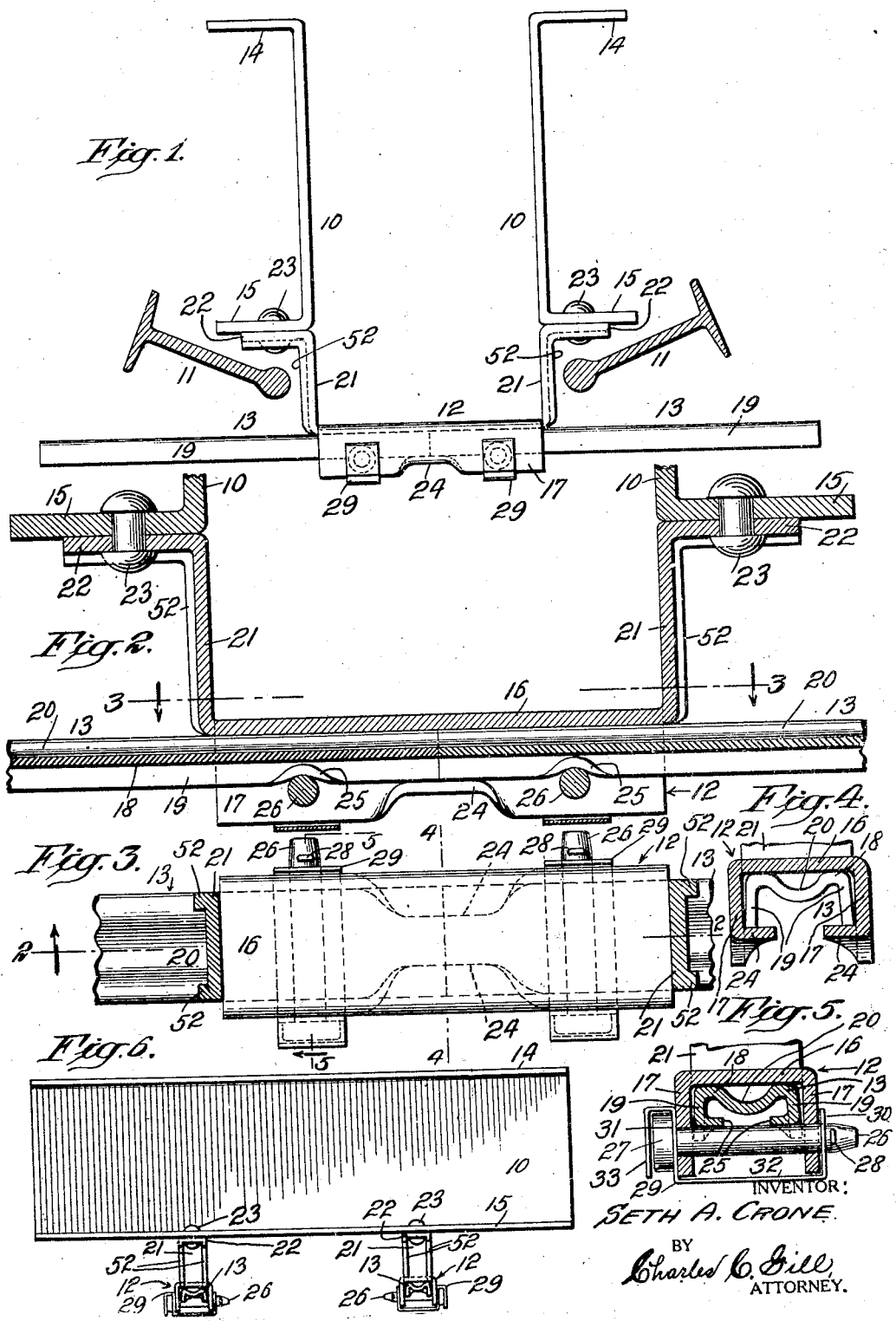

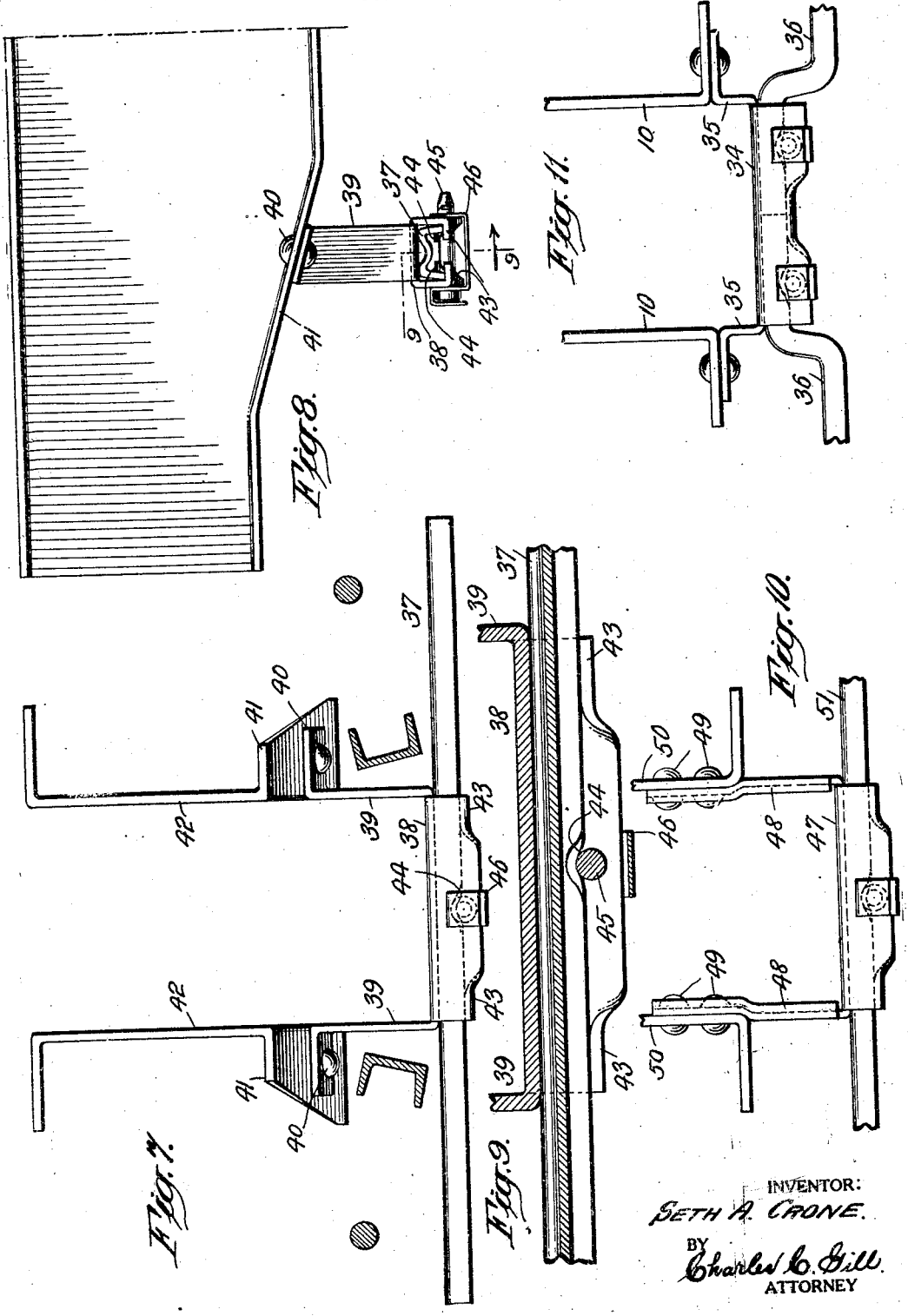

Patented Sept. 1, 1925.

1,552,049

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

EMERGENCY SAFETY SUPPORT FOR BRAKE BEAMS.

Application filed December 20, 1924. Serial No. 757,127.

*To all whom it may concern:*

Be it known that I, SETH A. CRONE, a citizen of the United States, and a resident of East Orange, in the county of Essex and State of New Jersey, have invented certain new and useful Improvements in Emergency Safety Supports for Brake Beams, of which the following is a specification.

The invention relates to railway brake beams, and particularly to novel emergency or safety bars extending below and to receive the brake beams in the event that said beams should become detached from their hangings, one purpose of the invention being to prevent, in case of accident, the brake beams from falling under the wheels, derailment being thus avoided.

The invention resides in the means I have provided for securing the emergency or safety bars and suspending the same from the transoms employed in some classes of car trucks, these means being adapted to said transoms and to very firmly support and clamp the emergency or safety bars in position, said bars also being so secured as to permit of their convenient removal, when necessary, in a speedy and convenient manner.

In carrying out my invention I suspend from the transoms a novel form of inverted channel-like wrought metal supporting bracket adapted to receive, support and clamp the emergency or safety bars whether said bars at the opposite sides of the truck should be in one integral piece or in two pieces. The supporting brackets are suspended from and secured to the transoms by integral end members or straps which extend upwardly from the ends of the bracket and are riveted to the transoms of the car truck. There will be a supporting bracket at each side of the car truck, and each bracket will support an emergency or safety bar either formed in one piece or in two corresponding pieces, one piece to extend below one brake beam and the other piece below the other brake beam. The safety bars are free of the brake beams and only become essential in case of some accident by which the brake beams might become unhung or fall downwardly. The safety bars are clamped and locked within the supporting brackets by transverse pins which extend between the sides of the bracket and engage transverse recesses in the bars, said pins when in position preventing the bars from having endwise movement and binding the bars against the top of the bracket.

The invention will be fully understood from the detailed description hereinafter presented, reference being had to the accompanying drawings, in which:

Fig. 1 is a side elevation of a portion of a car truck equipped with the features of my invention, the portion of the car truck shown being the transoms, and the brake beams being indicated in section;

Fig. 2 is a longitudinal section, partly broken away, through the same, the section being on a larger scale and on the dotted line 2—2 of Fig. 3;

Fig. 3 is a top view, partly in section and partly broken away of the same, the section being on the dotted line 3—3 of Fig. 2;

Fig. 4 is a vertical transverse section through the same, taken on the dotted line 4—4 of Fig. 3;

Fig. 5 is a vertical transverse section through the same taken on the dotted line 5—5 of Fig. 3;

Fig. 6 is an end view of a portion of the car truck and illustrates the emergency or safety bars and their supporting means at opposite sides of the truck;

Fig. 7 is a side view of a portion of a car truck having transoms differing in form from those illustrated in Fig. 1 and requiring a slight modification in the upper ends of the emergency or saftey bar hangers; Fig. 7 illustrates the invention as applied to a one-piece emergency or safety bar instead of the two-piece emergency safety bar shown in Fig. 1, and in Fig. 7 the brake beams are indicated in section;

Fig. 8 is an end view, partly cut away, of a portion of a car truck, the transom being shown in face view so as to illustrate the form thereof as distinguished from the straight form of transom shown in Fig. 1;

Fig. 9 is a vertical section, on a larger scale, through a portion of the same taken on the dotted line 9—9 of Fig. 8;

Fig. 10 is a side view, partly broken away, of a portion of a car truck equipped with the emergency or safety bar features of my invention, the modification residing simply in the form given to the upper ends of the hanger adapting them to be secured to the inner faces of the transoms, and Fig. 11 is a side view, partly broken away, of a portion of a car truck equipped with a further modification of the features of my invention, the emergency or safety bars being shown in two pieces and as having been bent downwardly near their supporting bracket to pass below the brake beams.

In the drawings, referring to Figs. 1 to 6 inclusive, 10 designates parallel transoms of known type, 11 inside hung brake beams, 12 the inverted channel-like supporting bracket of my invention, and 13 the emergency or safety bars supported in said bracket and extending longitudinally below and free of the brake beams, it being understood that there is a bracket 12 and safety bars at both sides of the truck and below the end portions of the brake beams.

The transoms 10 are vertical and properly spaced apart, and said transoms are formed with horizontally extending upper flanges 14 and lower flanges 15.

The supporting bracket 12 is formed of wrought metal and of inverted channel-shape, having a top 16 and side members 17, which are spaced apart and parallel with each other and receive between them the emergency bars 13, said bars being of any suitable cross-section but by preference of inverted channel-form having a top member 18 and depending side flanges 19, as shown in Figs. 4 and 5. For the purpose of securing strength in and compactness of the safety bars 13, the longitudinal central portions of the top of said bars are depressed, as at 20, the depression 20 forming a longitudinal groove extending throughout the full length of the bars 13 which, except for the groove 20, would, possessing the same quantity of metal, occupy both vertically and laterally more space than is taken up by the bars 13 of the special construction presented.

The supporting bracket 12 is formed integrally with end members of straps 21 which initially constitute extensions of the upper portions of the bracket, but are bent vertically to form the members 21 which have their upper ends bent laterally to form flanges 22 matching against the lower flanges 15 of the transoms and being secured thereto by rivets 23. The end members or straps 21 constitute hangers, and the bracket 12 is suspended from the transoms 10 by means of these hangers, which, by being integral with the bracket and of wrought metal, afford very firm supports for the bracket.

The middle portions of the lower edges of the side flanges 17 of the supporting bracket 12 are flanged inwardly toward each other to form seats 24 for the adjoining ends of the safety bars 13, said bars in the construction shown in Figs. 1 to 5 inclusive being in two parts or pieces, one extending below one of the brake-beams and the other below the other brake beam, as shown in Fig. 1. The seats 24 are centrally of the brackets 12 and of proper length to support the adjoining ends of both bars 13.

The end portions of the bars 13 located within the bracket 12 have the lower edges of their side flanges 19 recessed upwardly and flanged inwardly, as at 25, to interlock with transverse pins 26 which extend through close-fitting apertures or holes formed in the side members 17 of the bracket 12. The recesses 25 are of concave formation and are closely engaged by the pins 26, whose upper plane is somewhat above the upper horizontal plane of the seats 24 for the adjoining ends of the bars 13. The relation of the pins 26 and seats 24 to each other is such that when the pins 26 are driven through the side members of the bracket and into the recesses 25 of the side members of the bars 13, the upper surface of said bars are pressed strongly against the lower surface of the top 16 of the bracket 12, and that said bars are not only firmly clamped within the bracket 12, but are locked against endwise movement.

The pins 26 have a drive-fit against the sides of the bracket 12 and the lower edges of the bars 13, and to facilitate the positioning of the pins 26 said pins have tapered forward ends, as shown more particularly in Fig. 5. The pins 26 are transverse and of durable character, and are provided on one end with a head 27 and at the other end are equipped with cotter keys 28. In order to prevent any possible loss of the pins 26 due to the loss of the cotter keys 28 or the inadvertent omission of a cotter key from the pin, I preferably equip the bracket 12 with a pin lock 29 formed from a strip of sheet metal and having one end member 30 against the outer face of one side of the bracket 12 and containing a hole through which the pin 26 passes, a like member 31 against the other outer face of the bracket 12, and having a hole through which the pin passes, a member 32 connecting the members 30, 31, and an extension member 33 which extends from the upper end of the member 31 and is bent outwardly and downwardly to lie against the head 27 of the pin, as shown in Fig. 5. It will be obvious, without comment, that the presence of the lock 29 will prevent the loss of the pin 26 should the cotter key 28 be absent or become broken or lost.

The construction shown in Figs. 1 to 6 inclusive is intended for pressed steel car trucks of known type, and the object is to provide these trucks with safety bars to receive the brake beams in the event that the beams should become unhung or fall downwardly. The bracket 12 being of wrought metal and having integral hangers 21 is of great durability, and the seats 24 formed on said brackets, plus the presence of the pins 26, provide very secure supporting and clamping means for the bars 13.

In Fig. 11 I have shown a modification of the structure shown in Fig. 1 in that I have shortened the hangers to lift the bracket to a more elevated position and have bent the safety bars downwardly at their inner portions so that the body of said bars may extend below the brake beams. In Fig. 11 I number the transoms 10 since they remain unchanged and I number the supporting bracket, being a modification, 34, the hangers thereof 25, and the safety bars 36. There is no change in the bracket 34 from the construction shown in Fig. 1 except that the hangers 35 are shorter than the hangers 21 of Fig. 1, and hence the construction shown in Fig. 11 will be fully understood without specific description.

In Figs. 7, 8 and 9 I illustrate a further modification in that in the construction shown in Figs. 7 to 9 inclusive I employ at each side of the truck a single safety bar 37, this bar being in one piece instead of in two pieces as shown in Fig. 1. The supporting bracket 38 shown in Figs. 7 to 9 inclusive, is of wrought metal and of inverted channel form and has integrally with its ends the upwardly extending end members or straps 39 which are secured by rivets 40 to the lower surfaces of the flanges 41 formed on the transoms 42. These transoms differ slightly in shape from the transoms 10 shown in Fig. 6.

The lower end portions of the sides of the supporting bracket 38 are flanged inwardly toward each other to form seats 43 for the side edges for the safety bar 37, as clearly shown in Figs. 8 and 9. The safety bar 37 may be of any suitable cross-section, but preferably is of inverted channel form, and the lower side edges of said bar, at the center thereof, are flanged inwardly and upwardly, as at 44, to form concave recesses whose upper edges are slightly above the horizontal plane of the upper edges of the seats 43. The bar 37 very snugly fits between the top of the seats 43 and the top of the bracket 38, and the bar is clamped in position within the bracket 38 and locked against endwise movement by means of a transverse pin 45, which extends through holes in the sides of the bracket 38 and through the recesses 44 in the lower edges of the bar 37 and tightly bind the bar upwardly against the inner upper surface of the bracket. The recesses 44 and pins 45 also cooperate to prevent the bar 37 from having endwise movement along the bracket 38. The pin 45 is exactly the same as the pin 26 described with reference to the construction shown in Figs. 1 to 5 inclusive, and said pin is equipped with a retaining lock 46 the same as the lock 29 shown in Fig. 5, and hence these features need not be further described. Since the bar 37 is in one integral piece, a single pin 45 for each bracket 38 is sufficient, whereas when the safety bar is in two pieces, as shown in Fig. 1, two of the locking pins are necessary.

Fig. 10 shows the same construction described with respect to Figs. 7, 8 and 9 with the exception that the bracket 47 has its end members or hangers 48 offset inwardly at their upper portions and secured by rivets 49 to the inner facing sides of the transoms 50. The supporting bracket 47 is suspended by the hangers 48 and supports the safety bar 51, said bracket and safety bar, except for the hangers 48, being identical with the construction shown in Fig. 7. The construction shown in Fig. 10 will be understood without further special description.

The end members or hangers of the safety bar supporting brackets are preferably flanged at their edges, as at 52, in Figs. 1, 2, 3 and 6, for the purpose of increasing the strength of the same, these flanges being formed from a part of the channel from which the bracket proper is formed. I have shown the flanges 52 in Figs. 1, 2, 3 and 6, and it will be understood that I may apply these flanges to the end members of all of the brackets shown in the drawings.

In all the forms of my invention hereinbefore described, the supporting bracket and safety bar may be conveniently suspended from the transoms of a pressed steel car truck by hangers integral with the brackets. The brackets for supporting the safety bars are of special construction and adequately support the safety bars and clamp them against rattling motion and also against endwise movement. The safety bars of the construction shown are of extremely durable and compact construction and cooperate with the wrought metal brackets in providing attachments well adapted for car truck service.

I do not limit my invention to all the details of form and construction hereinbefore pointed out, nor in every instance to the use of the special safety bar shown. The details of construction admit of modification to suit different types of transoms, as may be understood by reference to Figs. 6 and 7.

What I claim as my invention and desire to secure by Letters-Patent, is:

1. In a car-truck having a framing connecting the side frames thereof and inside hung brake-beams, emergency safety-bars extending longitudinally below and normally free of the end portions of the beams, and means removably supporting said bars from said framing, comprising brackets secured to said framing and having depending side members, the lower middle portions of which are flanged inwardly to provide seats for the adjoining ends of said bars, and transverse pins extending through said side members adjacent to the end portions thereof and engaging said bars for securing said bars and locking them against endwise movement.

2. In a car-truck having a framing connecting the side frames thereof and inside hung brake-beams, emergency safety-bars extending longitudinally below and normally free of the end portions of the beams, and means removably supporting said bars from said framing, comprising brackets secured to said framing and having depending side members, the lower middle portions of which are flanged inwardly to provide seats for the adjoining ends of said bars, and transverse pins extending through said side members adjacent to the end portions thereof and engaging said bars for securing said bars and locking them against endwise movement, said bars being transversely recessed at said pins to interlock therewith.

3. In a car-truck having a framing connecting the side frames thereof and inside hung brake-beams, emergency safety-bars extending longitudinally below and normally free of the end portions of the beams, and means removably supporting said bars from said framing, comprising brackets secured to said framing and having depending side members, the lower middle portions of which are flanged inwardly to provide seats for the adjoining ends of said bars, and transverse pins extending through said side members adjacent to the end portions thereof and engaging said bars for securing said bars and locking them against endwise movement, said brackets being of inverted channel formation and said bars being of inverted channel formation and recessed at said pins to interlock therewith.

4. In a car-truck having a framing connecting the side frames thereof and inside hung brake-beams, emergency safety-bars extending longitudinally below and normally free of the end-portions of the beams, and means removably supporting said bars from said framing, comprising brackets having integral upwardly extending end members secured to said framing and depending side members, the lower middle portions of which are flanged inwardly to provide seats for the adjoining ends of said bars, and transverse pins extending through said side members adjacent to the end portions thereof and engaging said bars for securing said bars and locking them against endwise movement.

5. In a car-truck having a framing connecting the side frames thereof and inside hung brake-beams, emergency safety-bars extending longitudinally below and normally free of the end portions of the beams, and means removably supporting said bars from said framing, comprising brackets having integral upwardly extending end members, flanged along their opposite edges, secured to said framing and depending side members, portions of which are flanged inwardly to provide seats for said bars, and transverse pins extending through the side members of said brackets and engaging said bars for securing said bars and locking them against endwise movement.

6. In a pressed steel car truck having flanged transoms and inside hung brake-beams, emergency safety-bars extending longitudinally below and normally free of the end portions of the beams, and means removably supporting said bars from said transoms, comprising brackets having integral upwardly extending end members riveted to said transoms and depending side members, portions of which are flanged inwardly to provide seats for said bars, and transverse pins extending through the side members of said brackets and engaging said bars for securing said bars and locking them against endwise movement.

7. In a pressed steel car-truck having flanged transoms and inside hung brake-beams, emergency safety-bars extending longitudinally below and normally free of the end portions of the beams, and means removably supporting said bars from said transoms, comprising brackets having integral upwardly extending end members riveted to said transoms and depending side members, portions of which are flanged inwardly to provide seats for said bars, and transverse pins extending through the side members of said brackets and engaging said bars for securing said bars and locking them against endwise movement, said end members constituting hangers and suspending the body portions of the brackets below said transoms.

8. In a pressed steel car-truck having flanged transoms and inside hung brake-beams, emergency safety-bars extending longitudinally below and normally free of the end portions of the beams, and means removably supporting said bars from said transoms, comprising brackets having integral upwardly extending end members riveted to said transoms and depending side members, portions of which are flanged inwardly to provide seats for said bars, and transverse pins extending through the side members of said brackets and engaging said bars for securing said bars and locking them against endwise movement, said end members being flanged along their opposite edges and constituting hangers and suspending the body portions of the brackets below said transoms.

9. In a pressed steel car-truck having flanged transoms and inside hung brake-beams, emergency safety-bars extending longitudinally below and normally free of the end portions of the beams, and means removably supporting said bars from said transoms, comprising brackets having integral upwardly extending end members riveted to said transoms and depending side members, portions of which are flanged inwardly to provide seats for said bars, and transverse pins extending through the side members of said brackets and engaging said bars for securing said bars and locking them against endwise movement, said end members being flanged laterally at their upper ends at which they are riveted to the lower flanges of the transoms, and said end members constituting hangers suspending the body portions of the brackets below said transoms.

10. In a pressed steel car-truck having flanged transoms and inside hung brake-beams, emergency safety-bars extending longitudinally below and normally free of the end portions of the beams, and means removably supporting said bars from said transoms, comprising brackets having integral upwardly extending end members riveted to said transoms and depending side members, portions of which are flanged inwardly to provide seats for said bars, and transverse pins extending through the side members of said brackets and engaging said bars for securing said bars and locking them against endwise movement, said end members constituting hangers and suspending the body portions of the brackets below said transoms, and said bars being transversely recessed at said pins to interlock therewith.

11. In a pressed steel car-truck having flanged transoms and inside hung brake-beams, emergency safety-bars extending longitudinally below and normally free of the end portions of the beams, and means removably supporting said bars from said transoms, comprising brackets having integral upwardly extending end members riveted to said transoms and depending side members, portions of which are flanged inwardly to provide seats for said bars, and transverse pins extending through the side members of said brackets and engaging said bars for securing said bars and locking them against endwise movement, said end members constituting hangers and suspending the body portions of the brackets below said transoms, and said brackets being of inverted channel formation and said bars being of inverted channel formation and recessed at said pins to interlock therewith.

12. In a pressed steel car-truck having transoms and inside hung brake-beams, emergency safety-bars extending longitudinally below and normally free of the end portions of said beams, and means removably supporting said bars from said transoms, comprising brackets having depending side members, portions of which are flanged inwardly to provide seats for said bars, hangers riveted to said transoms and suspending said brackets below the same, and transverse pins extending through the side members of said brackets and engaging said bars and securing said bars against endwise movement.

13. In a pressed steel car-truck having transoms and inside hung brake-beams, emergency safety-bars extending longitudinally below and normally free of the end portions of said beams, and means removably supporting said bars from said transoms, comprising brackets having depending side members, portions of which are flanged inwardly to provide seats for said bars, hangers riveted to said transoms and suspending said brackets below the same, and transverse pins extending through the side members of said brackets and engaging said bars and securing said bars against endwise movement, said bars being transversely recessed at said pins to interlock therewith.

14. In a pressed steel car-truck having transoms and inside hung brake-beams, emergency safety-bars extending longitudinally below and normally free of the end portions of said beams, and means removably supporting said bars from said transoms, comprising brackets having depending side members, portions of which are flanged inwardly to provide seats for said bars, hangers riveted to said transoms and suspending said brackets below the same, and transverse pins extending through the side members of said brackets and engaging said bars and securing said bars against endwise movement, said brackets being of inverted channel formation and said bars being of inverted channel formation and recessed at said pins to interlock therewith.

Signed at New York city, in the county of New York and State of New York, this 18th day of December, A. D. 1924.

SETH A CRONE.